(12) United States Patent
Dawley

(10) Patent No.: US 9,670,376 B1
(45) Date of Patent: Jun. 6, 2017

(54) HYBRID SOL-GEL COATING MATERIALS AND COATINGS AND METHODS OF FORMING AND USING THEREOF

(71) Applicant: Advenira Enterprises, Inc., Sunnyvale, CA (US)

(72) Inventor: Jeff Dawley, Sunnyvale, CA (US)

(73) Assignee: Advenira Enterprises, Inc., Sunnyvale, CA (US)

( * ) Notice: Subject to any disclaimer, the term of this patent is extended or adjusted under 35 U.S.C. 154(b) by 0 days.

(21) Appl. No.: 15/212,401

(22) Filed: Jul. 18, 2016

(51) Int. Cl.
*C09D 151/10* (2006.01)
*C09D 5/08* (2006.01)
*B05D 3/06* (2006.01)
*C09D 7/12* (2006.01)
*C09D 141/00* (2006.01)

(52) U.S. Cl.
CPC ........... *C09D 151/10* (2013.01); *B05D 3/065* (2013.01); *C09D 5/08* (2013.01); *C09D 7/1266* (2013.01); *C09D 141/00* (2013.01)

(58) Field of Classification Search
CPC ....... C09D 4/00; C09D 141/00; C09D 7/1266
See application file for complete search history.

(56) References Cited

U.S. PATENT DOCUMENTS

| | | | | |
|---|---|---|---|---|
| 4,617,327 A | * | 10/1986 | Podszun | A61K 6/083 523/116 |
| 6,657,691 B2 | * | 12/2003 | Ochiai | G02B 1/111 349/137 |
| 7,495,037 B2 | * | 2/2009 | Moszner | A61K 6/0017 522/908 |
| 2005/0261389 A1 | * | 11/2005 | Bratolavsky | C08G 18/2885 522/71 |
| 2012/0202037 A1 | | 8/2012 | Ryabova | |
| 2016/0108250 A1 | * | 4/2016 | Tamura | B32B 27/08 522/42 |

OTHER PUBLICATIONS

Ryabova, Elmira et al., "Environmentally Friendly Corrosion Protection", 2015 Department of Defense—Allied Nations Technical Corrosion Conference Presentation, Nov. 18, 2016, 12 pgs.

* cited by examiner

*Primary Examiner* — Margaret Moore
(74) *Attorney, Agent, or Firm* — Kwan & Olynick LLP

(57) ABSTRACT

Provided are hybrid sol-gel coating materials and method of synthesizing such materials. Also, provided are methods of forming hybrid sol-gel coatings from such coating materials. In some embodiments, a hybrid sol-gel coating material includes a hydrolyzed inorganic component and organic component. Functional groups of the inorganic component may react with each other in a sol-gel condensation reaction, while functional groups of the organic component may be subjected to free-radical induced polymerization thereby bonding the inorganic and organic components in a resulting hybrid organic-inorganic sol-gel coating. The coating material may also comprise nanoparticles, which may be bonded to other components in a resulting coating. The inorganic component may be a silane or, more specifically, tetraethoxysilane, while the organic component may be an acrylate or, more specifically, mercapto functionalized polyester acrylate, aromatic epoxy acrylate, and/or polyurethane acrylate. The hybrid sol-gel coating material may also include a coupling agent, catalyst, and/or diluent.

20 Claims, 5 Drawing Sheets

HYBRID SOL-GEL COATING MATERIALS AND COATINGS AND METHODS OF FORMING AND USING THEREOF

BACKGROUND

Corrosion protection, mechanical surface protection (e.g., scratch resistance), optical properties correction, and other aspects of surface coatings are becoming increasingly important for different coating applications and products containing such coatings. For example, metals, such as aluminum, steel, and stainless steel, often need to be protected from atmospheric exposures, water, and chemical corrosion in different structural components (e.g., vehicles, buildings), gas and liquid transport systems (e.g., water distribution, gas lines), and the like. Corrosion protection coatings can help to extend operating lifespan of these components without requiring costly maintenance and upkeep. In recent years, the development of environmental friendly (green) coatings has been of particular interest. Chromates, which are commonly used for corrosion protection, have been found to have negative impact on the environment and human health. The primary challenge for environmental friendly coatings for industrial applications has been their ability to provide the broad set of anti-corrosion, mechanical, and other properties needed for given applications (and, in some cases, previously achieved by chromate conversion coatings). Similar challenges exist for other types of coatings.

SUMMARY

Provided are hybrid sol-gel coating materials and method of synthesizing such materials. Also, provided are methods of forming hybrid sol-gel coatings from such coating materials. In some embodiments, a hybrid sol-gel coating material includes a hydrolyzed inorganic component and organic component. Functional groups of the inorganic component may react with each other in a sol-gel condensation reaction, while functional groups of the organic component may be subjected to free-radical induced polymerization thereby bonding the inorganic and organic components in a resulting hybrid organic-inorganic sol-gel coating. The coating material may also comprise nanoparticles, which may be bonded to other components in a resulting coating. The inorganic component may be a silane or, more specifically, tetraethoxysilane, while the organic component may be an acrylate or, more specifically, mercapto functionalized polyester acrylate, aromatic epoxy acrylate, and/or polyurethane acrylate. The hybrid sol-gel coating material may also include a coupling agent, catalyst, and/or diluent.

In some embodiments, a hybrid sol-gel coating material comprises an inorganic component, an organic component, and nanoparticles. The inorganic component is hydrolyzed. Specifically, the inorganic component comprises hydroxyl groups operable to react with each other in a sol-condensation reaction when the hybrid sol-gel coating material is activated (e.g., during the coating process and/or curing process). The organic component comprises acrylate groups operable to react with each other in a free-radical initiated polymerization reaction when the hybrid sol-gel coating material is activated. The nanoparticles are dispersed with a mixture of the inorganic component and the organic component. The solid content of the hybrid sol-gel coating material may be at least about 90% by weight In some embodiments, the inorganic component comprises a hydrolyzed derivative of a material selected from the group consisting of an alkyloxysilane, an aminosilane, an epoxy silane, an acroloxysilane, a methacrolyxysilane, and a polyether silane. Specifically, the inorganic component may comprise a hydrolyzed derivative of a material selected from the group consisting of methacryloxypropyltrimethoxysilane (MPTS), and tetraethoxysilane (TEOS). More specifically, the inorganic component may comprise hydrolyzed derivatives of both methacryloxypropyltrimethoxysilane (MPTS) and tetraethoxysilane (TEOS). The weight ratio of the hydrolyzed derivative of methacryloxypropyltrimethoxysilane (MPTS) to the hydrolyzed derivative of tetraethoxysilane (TEOS) is between about 0.1 and 10. The concentration of the inorganic component in the hybrid sol-gel coating material is between about 10% by weight and 400% by weight based on a solid content.

In some embodiments, the organic component comprises at least one acrylate selected from the group consisting of an acrylic-acrylate, epoxy-acrylate, a polyester acrylate, a polyether acrylate, and a urethane acrylate. Specifically, the organic component comprises a mercapto functionalized polyester acrylate. In the same or other embodiments, the organic component comprises bisphenol-A epoxy diacrylate. Furthermore, the organic component may comprise one or more multifunctional acrylates. The concentration of the organic component in the hybrid sol-gel coating material may be between about 30% by weight and 80% by weight based on a solid content.

In some embodiments, the nanoparticles of the hybrid sol-gel coating material comprise a material selected from the group consisting of silica, alumina, titania, ceria, zirconia, and antimony oxide. The concentration of the nanoparticles in the hybrid sol-gel coating material may be between is between about 5% by weight and 30% by weight based on a solid content.

In some embodiments, the hybrid sol-gel coating material of claim 1, further comprising a methacrylic acid. Other types of acids, such as nitric acid, carboxylic acids, and acetic acid may be used as well in addition or instead of the methacrylic acid. The concentration of the methacrylic acid in the hybrid sol-gel coating material may be between about 0.1% and 10% by weight. In some embodiments, the pH of the hybrid sol-gel coating material is between about 6 and 8.

In some embodiments, the hybrid sol-gel coating material comprises one or more reactive diluents, such as an acrylate. Some examples of suitable acrylates include, but are not limited to, isobornyl acrylate, hexanediol diacrylate, and trimethylolpropane triacrylate. The concentration of the acrylate of the one or more reactive diluents in the hybrid sol-gel coating material is between about 10% and 20% by weight.

In some embodiments, the hybrid sol-gel coating material further comprises an initiator selected from the group consisting of a photo-initiator and a thermal-initiator. Specifically, the hybrid sol-gel coating material may comprise a photo-initiator. In the same or other example, the hybrid sol-gel coating material comprises a thermal-initiator. More specifically, the hybrid sol-gel coating material may comprise both a photo-initiator and a thermal-initiator. Some examples of photo-initiator include but are not limited to 1-hydroxycyclohexylphenylketone and ethyl (2,4,6-trimethylbenzoyl) phenyl phosphinate. Additional examples include a Type 1 free-radical photo-initiator and a Type 2 free-radical photo-initiator. Examples of the thermal-initiator include but are not limited to an azo compound, a peroxide, or a tetra-phenyl-ethane derivative.

Also provided is a method of synthesizing a hybrid sol-gel coating material. The method comprises hydrolyzing an inorganic component thereby forming a hydrolyzed inorganic component and mixing the hydrolyzed inorganic component with an organic component and nanoparticles. The hydrolyzed inorganic component comprises hydroxyl groups operable to react with each other in a sol-condensation reaction during activation of the hybrid sol-gel coating material. The organic comprises acrylate groups operable to react with each other in a free-radical initiated polymerization reaction when the hybrid sol-gel coating material is activated.

In some embodiments, hydrolyzing the inorganic component comprises combining water and the inorganic component. The amount of water used for hydrolyzing the inorganic component substantially matches hydrolysable sites of the inorganic component. Furthermore, hydrolyzing the inorganic component may comprise combining the inorganic component with a methacrylic acid.

Various examples of inorganic and organic components are described above. For example, the inorganic component comprises a material selected from the group consisting of an alkyloxysilane, an aminosilane, and an epoxy silane. More specifically, the inorganic component may comprise tetraethoxysilane (TEOS).

In some embodiments, hydrolyzing the inorganic component comprises mixing methacryloxypropyltrimethoxysilane (MPTS) with the inorganic component. Hydrolyzing the inorganic component may be performed at a pH of between 2 and 2.2.

In some embodiments, the hydrolyzed inorganic component is combined with the nanoparticles prior to introducing the organic component. The nanoparticles may be introduced as a dispersion comprising a solvent. The solvent may have a boiling point at the atmospheric pressure of less than approximately 150 C. Some examples of suitable solvents include, but are not limited to, methyl-ethyl ketone, propylene glycol monomethyl ether acetate, and methyl isobutyl ketone.

In some embodiments, the method further comprises removing the solvent from a mixture of the hydrolyzed inorganic component, the organic component, and the nanoparticles. The method may comprise adding one or more initiators to a mixture of the hydrolyzed inorganic component, the organic component, and the nanoparticles. Furthermore, the organic component may be mixed with a diluent prior to mixing the hydrolyzed inorganic component with the organic component and nanoparticles.

Also provided is a method of forming a hybrid sol-gel coating. The method may involve applying a hybrid sol-gel coating material onto a surface of a part and curing the hybrid sol-gel coating material thereby forming the coating. Various examples of the hybrid sol-gel coating material are described above. Specifically, the hybrid sol-gel coating material may comprise an inorganic component, an organic component, and nanoparticles. The inorganic component is hydrolyzed. Specifically, the inorganic component comprises hydroxyl groups. The organic component comprises acrylate groups. The nanoparticles are dispersed with a mixture of the inorganic component and the organic component. During curing, the hydroxyl groups of the inorganic component react with each other in a sol-condensation reaction. Furthermore, during curing, the acrylate groups of the organic component react with each other in a free-radical initiated polymerization reaction.

Curing of the coating may comprise at least one of ultraviolet (UV) curing or heat curing. In some embodiments, curing of the coating comprises both ultraviolet (UV) curing and heat curing. For example, UV curing may be performed prior to the heat curing.

In some embodiments, the hybrid sol-gel coating is applied over a conversion coating. The part receiving the hybrid sol-gel coating may comprise a material selected from the group consisting of non-ferrous alloys, such as aluminum, magnesium, nickel, electroless-nickel, ferrous alloys, such as steel and stainless steel, galvanized steel, and non-metallic materials, such as glass, plastics, ceramics and anodized coatings.

These and other embodiments are described further below with reference to the figures.

DETAILED DESCRIPTION

Figure 1:
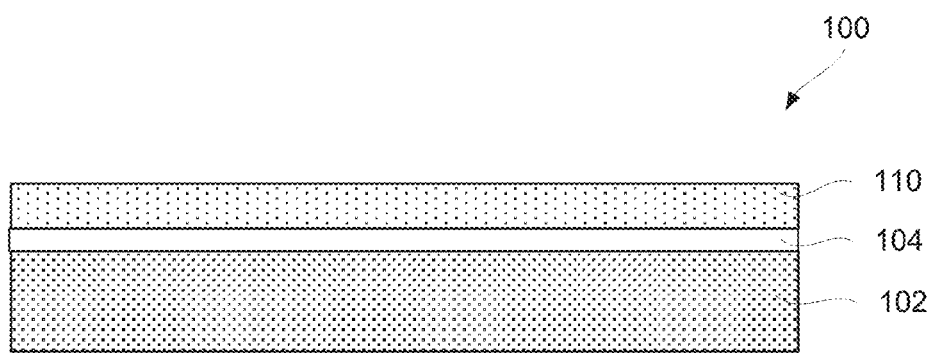
FIG. 1 is a schematic representation of a coated substrate comprising a hybrid sol-gel coating, in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific embodiments, it will be understood that these embodiments are not intended to be limiting.

Introduction

Various examples of hybrid sol-gel coatings described herein may be used as barrier coatings, surface protection coatings, optical coatings, and other types of coatings on metal, glass, plastic, and other substrates. For example, a hybrid sol-gel coating may be formed on a surface of a metal substrate to protect that substrate from corrosion in various environments, such as environments associated with a wide range of pH levels, ranging from strongly acidic to mildly alkaline environments (pH 0-10). In some embodiments, the hybrid sol-gel coating has excellent resistance to hydrochloric acid, sulfuric acid, and salt water. Furthermore, the hybrid sol-gel coating may have a low water uptake and be compatible with various other coatings, such as conversion coatings. Some examples of the hybrid sol-gel coating may be colorless and transparent thereby preserving the appearance of the substrate. In some embodiments, a hybrid sol-gel coating has excellent mechanical properties and wear resistance, such as resistance to abrasion and mechanical damage. Hybrid sol-gel coatings may have good adhesion to substrates, such as degreased and corrosion free surfaces, including steel, aluminum, galvanized steel, magnesium alloys, and stainless steel. The service temperature may exceed 100° C. and even 125° C.

These unique properties, not typical for conventional sol-gel coatings, of hybrid sol-gel coatings are achieved by specific combinations of inorganic and organic components that form a hybrid structures and may be bonded and/or cross-linked to each other in resulting coatings and/or to substrates. In some embodiments, the addition of nanoparticles to the inorganic and organic components also allows to tailor various properties of the resulting coatings, such as mechanical and corrosion properties. The nanoparticles may be functionalized for bonding to the inorganic and/or organic components and becoming a part of the overall material matrix.

Examples of Hybrid Sol-Gel Coating Materials

In some embodiments, a hybrid sol-gel coating material comprises an inorganic component, an organic component, and nanoparticles. During deposition of the hybrid sol-gel coating material various reactions are associated with the inorganic component and the organic component. For example, hydroxyl groups of the inorganic component may react with each other in a sol-condensation reaction. In the same or another example, acrylate groups of the organic component may react with each other in a free-radical initiated polymerization reaction. In some example, the organic component may include acrylic-acrylates and epoxy-acrylates having dual hydroxyl and acrylate functionality. Such acrylates may be capable of reacting with each other and with the inorganic component further extending hybrid aspects of the presented sol-gel coatings. In some embodiments, a coupling agent is added. The coupling agent may form bridges between the organic and inorganic components. Specifically, the coupling agent may be involved in both reactions and allow the inorganic and organic oligomers (formed in the corresponding reactions) to bond together. The combination of inorganic and organic components and bonding between the inorganic component and the organic component in a hybrid sol-gel coating formed from the hybrid sol-gel material is one of the distinguishing characteristics. Furthermore, at least one of the inorganic component or the organic component may form similar bonds to the nanoparticles. Other components of the hybrid sol-gel coating material may include a coupling agent, catalyst, and diluent.

For comparison, conventional sol-gel coatings are typically mostly inorganic and are thermally cured. The inorganic nature of these coatings limits coating flexibility since bonding is mainly ionic versus covalent. For example, coating adhesion is generally very substrate dependent for these coatings. Mechanical properties of these coating are poor due to their high porosity and weak particle-to-particle bonding. Furthermore, design and deposition of conventional sol-gel coatings provide very limited abilities to tailor their coefficients of thermal expansion (CTE). As a result, CTE mismatch with substrates often limits the achievable crack-free coating thicknesses. Chemical resistance is established by the intrinsic coating material and the ability to densify the coating and is generally poor for conventional sol-gel coatings, unless processed to temperatures in excess of 500° C.

On the other hand, hybrid sol-gel coating materials and resulting coatings, which are described herein, have properties that are tailorable by forming a hybrid organic-inorganic nanocomposite. Examples of these tailorable properties include thermal properties (CTE), optical properties (refractive index, haze), mechanical properties (abrasion, hardness), chemical resistance (acids, bases, solvents), and water uptake. These properties are further described below. Furthermore, hybrid sol-gel coatings can have the flexibility and adhesion comparable to organic coatings, along with enhanced mechanical properties and corrosion resistance of inorganic coatings. In other words, the synergetic effect of different types of coatings is achieved with hybrid sol-gel coating materials. Furthermore, hybrid sol-gel coatings can be formed with much thicker layers than, for example, conventional sol-gel coatings due to better adhesion, CTE matching, and the like. Finally, hybrid sol-gel coatings may be formed as very dense coatings without high temperature treatments (needed to densify the conventional coatings).

Each of the inorganic component and organic component contains at least one operable functional group that reacts with like functional groups to form a hybrid sol-gel coating when cured. For example, the inorganic component comprises hydroxyl groups operable to react with each other in a sol-condensation reaction during activation of the hybrid sol-gel coating material. The organic component comprises acrylate groups operable to react with each other in a free-radical initiated polymerization reaction when the hybrid sol-gel coating material is activated. In some embodiments, a single component (e.g. an acrylic-acrylate or epoxy-acrylate) of a hybrid sol-gel coating material may have both inorganic and organic functional groups. Also, in same or other embodiments, a single component coupling agent (e.g. a methacryloxysilane) possessing both inorganic and organic functional groups can be added to enhance coating network formation. For example, when the inorganic component is a silane, its functional group is Si—O—H or Si—O—R. When the organic component is an acrylate, there are at least two functional groups that are contained within the acrylol group: C═C and C═O. The acrylol groups are typically made active through free-radical initiation. For some embodiments other available functional groups can include C—OH or C—OR.

Functional groups of the organic and inorganic components allow for the possibility of up to five basic reactions between sub-components being involved in forming the organic-to-inorganic network within a hybrid sol-gel coating: (1) a reaction of the hydrolyzed inorganic component with itself; (2) a reaction of the hydrolyzed inorganic component with a hydrolyzed coupling agent; (3) a reaction of the hydrolyzed coupling agent with itself; (4) a free-radical polymerization of the acrylol groups of the coupling agent with the organic component; and (5) a free-radical polymerization of the acrylol groups of the organic components with itself. It should also be noted that hydrolyzed inorganic component and the hydrolyzed coupling agent may also react with hydroxyl groups on the surface of the substrate. This reaction provides good adhesion between the hybrid sol-gel coating and substrate. Furthermore, in the case of organic components with dual organic and inorganic functional groups there are two additional reactions; (6) a reaction of the hydrolyzed inorganic component with a hydroxyl functionalized acrylate of the organic component; and (7) a reaction of the hydrolyzed coupling agent with a hydroxyl functionalized acrylate of the organic component.

Examples of each component of the hybrid sol-gel coating material will now be described in more detail, starting with the inorganic component. The inorganic component of the hybrid sol-gel coating material may be hydrolyzed. In some embodiments, the inorganic component may be partially hydrolyzed (e.g., between about 50-95% of reactive sites may be hydrolyzed or more specifically, between about 70-90%). Various examples of hydrolysis are described below.

In some embodiments, the inorganic component comprises tetraethoxysilane (TEOS) and/or tetramethylorthosilicate TMOS. In general, any metal alkoxide where the hydrolyzed metal alkoxide is stabilized against condensation in the coating formulation, but becomes active during the coating curing process, may be used. These metal alkoxide may include zirconium (Zr), titanium (Ti), and cerium (Ce).

Tetraethoxysilane (TEOS) is an inorganic component that adds an inorganic component to the coating network (Si—O). It may be used to decrease flexibility of the resulting hybrid sol-gel coating (e.g., by providing shorter and stiffer links between organic molecules). Furthermore, addition of the inorganic component such as tetraethoxysilane (TEOS) is believed to improve mechanical, chemical, and UV resistance properties in comparison, for example, with conventional hybrid sol-gel coatings formed from organic components alone.

It should be noted that tetraethoxysilane (TEOS), tetramethylorthosilicate TMOS, metal alkoxides (as noted above), and coupling agents may be viewed as a single category of materials for hybrid sol-gel coating materials.

In some embodiments, the hybrid sol-gel coating material further comprises a coupling agent. For example, the coupling agent may be a hydrolyzed derivative of a material selected from the group consisting of an alkyloxysilane, an aminosilane, an epoxy silane, an acroloxysilane, a methacrolyxysilane, and a polyether silane. Some specific examples include hydrolyzed derivatives of methacryloxypropyltrimethoxysilane (MPTS). The silane end can be involved with surface reactions via condensation reactions, while the methacryloxy end can be involved with the UV polymerization process.

In some embodiments, the hybrid sol-gel coating material may comprise a hydrolyzed derivative of methacryloxypropyltrimethoxysilane (MPTS) and a hydrolyzed derivative of tetraethoxysilane (TEOS). In this example, the weight ratio of the hydrolyzed derivative of methacryloxypropyltrimethoxysilane (MPTS) to the hydrolyzed derivative of tetraethoxysilane (TEOS) may be between about 0.1 and 10 or, more specifically, between 0.2 and 5 or even between 0.5 and 2.

In some embodiments, the concentration of the inorganic component in the hybrid sol-gel coating material is between about 10% by weight and 40% by weight based on a solid content or, more specifically, between about 20% and 30%. The concentration of the organic component in the hybrid sol-gel coating material may be between about 30% by weight and 80% by weight based on a solid content or, more specifically, between about 40% and 70%. The concentration may depend on desired mechanical properties (e.g., flexibility, abrasion resistance, impact resistance) and/or chemical properties of the resulting coating. Without being restricted to any particular theory, it is believed that too much inorganic material may cause the resulting hybrid sol-gel coating to be hard but extremely brittle, and this coating may easily crack and have insufficient flexibility for many applications.

Turning to the organic component of the hybrid sol-gel coating material, the organic component may comprise at least one acrylate selected from the group consisting of an acrylic-acrylate, epoxy-acrylate, a polyester acrylate, a polyether acrylate, and a urethane acrylate. For example, the organic component comprises a mercapto (thiol), amino, isocyanato and/or hydroxyl functionalized polyester acrylate, bisphenol-A epoxy diacrylate or an aliphatic urethane acrylate. In another example, the organic component includes a mixture of reactive multi-functional acrylates. The resulting hybrid sol-gel coating formed from the reactive multi-functional acrylates may have excellent abrasion resistance and chemical resistance. However, its flexibility may not be sufficient for many applications.

In some embodiments, a mercapto functionalized polyester acrylate may be used in combination with an epoxy-acrylate. It has been found that full replacement of the epoxy-acrylate with the mercapto functionalized polyester acrylate appears to create an air-curable hybrid sol-gel coating. When a hybrid sol-gel coating material includes some epoxy-acrylate different curing techniques may be used, such as curing in a reduced oxygen environment. Another curing technique for hybrid sol-gel coating materials containing epoxy-acrylates includes high intensity UV exposure and/or the addition of amine synergists. Addition of urethane acrylates could be help with weatherability and other properties. In general, a low-viscosity aromatic monoacrylate oligomer may be used as the organic component.

Turning to the nanoparticles of the hybrid sol-gel coating material, the nanoparticles may be dispersed with a mixture of the inorganic component and the organic component. While nanoparticles may be inorganic, it should be noted that the hybrid sol-gel coating material includes at least one other inorganic component. In other words, when this disclosure makes a reference to an inorganic component, this reference applies to a component other than nanoparticles.

The nanoparticles may be acrylate functionalized. Some examples of suitable nanoparticle materials include, but are not limited to, silica, alumina, titania, ceria, zirconia, and antimony oxide. The concentration of the nanoparticles in the hybrid sol-gel coating material may be between is between about 5% by weight and 30% by weight based on a solid content or, more specifically, between about 10% by weight and 25% by weight. Without being restricted to any particular theory, it is believed that addition of the nanoparticles enhances abrasion of the hybrid sol-gel coating and may improve its corrosion resistance (e.g., by decreasing its permeability).

In some embodiments, the hybrid sol-gel coating material further comprise a catalyst. One example of the catalyst is methacrylic acid. Specifically, methacylic acid may be used to catalyze the hydrolysis of the inorganic and coupling components, e.g., silane and TEOS. The concentration of methacrylic acid in the hybrid sol-gel coating material may be between about 0.1% and 10% or, more specifically, between about 0.2% and 5%. Methacylic acid may be added into the hybrid sol-gel coating material during its synthesis or right prior to use of the material to form a coating. It should be noted that conventional hybrid sol-gel coating materials typically use hydrochloric acid, acetic acid, nitric acid, and other like acids as catalysts. However, unlike these other acids methacrylic acid can be photopolymerized and can be incorporated into the hybrid sol-gel coating matrix. Other acids are typically not sufficiently UV reactive in comparison with methacrylic acid. Furthermore, other acids may leave residues (e.g., hydrochloric acid may leave chloride ions) in the hybrid sol-gel coating, which may not suitable for some application.

In some embodiments, pH of the hybrid sol-gel coating material is between about 6 and 8 such as about 7. In other words, the hybrid sol-gel coating material may be substantially neutral, for example, to minimize reactions between the hybrid sol-gel coating and coated substrates, in particular metal substrates. Some metals are pH sensitive and can become unstable in acidic or basic environments.

In some embodiments, the hybrid sol-gel coating material further comprises one or more reactive diluents or, more specifically, a mono-functional reactive diluent. One example is an acrylate or, more specifically, isobornyl acrylate, hexanediol diacrylate, or trimethylolpropane triacrylate. The concentration of the reactive diluents in the hybrid sol-gel coating material may be between about 5% and 25% by weight or, more specifically, between about 10% and 20% by weight. The reactive diluent may be used to control the viscosity of the hybrid sol-gel coating material, which in some embodiments, may be between about 10 cP and 1000 cP or, more specifically, between about 50 cP and 500 cP (when measured at 25° C. using Brookfield cone-plate system).

In some embodiments, the hybrid sol-gel coating material further comprises an initiator, such as a photo-initiator (Type I and/or Type II) and a thermal-initiator. Some examples of photo-initiators include but are not limited to alpha hydroxy ketones (e.g. 1-hydroxycyclohexylphenylketone) and acyl phosphine oxides (e.g. phenyl bis (2,4,6-trimethylbenzoyl)-phosphine oxide), Type I free-radical photo-initiators, and benzophenones and thioxanthones, Type 2 free-radical photo-initiators. Type 2 free-radical photo-initiators are often coupled with amine synergists for improved surface cure. Commercial versions of free-radial initiations and amine synergist include Igracure 184, Igacure TPO, Igacure TPO-L, Igacure 819 (BASF) and CN386 (Sartomer). Examples of free-radical thermal initiators include azo compounds (e.g. 2,2'-Azobisisobutyronitrile (AIBN), peroxide (e.g. benzoyl peroxide), and tetra-phenyl-ethane derivatives.

In some embodiments, the solid content of the hybrid sol-gel coating material is at least about 90% by weight or even at least about 95% by weight. Even though solvents may be used during synthesis of the hybrid sol-gel coating material, these solvents may be eventually removed. A high solid content simplifies the curing process and allows forming very low porosity and even non-porous coatings. Specifically, eliminating solvents from the hybrid sol-gel coating material, eliminate the need to remove these solvents during curing. The specific gravity of the hybrid sol-gel coating material may be between about 1 and 1.4 or, more specifically, between about 1.1 and 1.2.

In some embodiments, a carrier solvent can be added to improve the coating characteristics of the hybrid sol-gel coating material. Examples of such solvents include organic solvents such as simple alcohols, carboxylate esters, and ketones, e.g. ethanol, propanol, methyl acetate, ethyl acetate, acetone and methyl ethyl ketone.

In addition to the above-described embodiments, various additives such as UV absorbers (organic and inorganic), light stabilizers, and rheology and coating modifiers may be added to the formulation composition of the present invention, as required. Examples of organic UV absorbers include TINUVIN® 400, TINUVIN® 460 and TINUVIN® 479 (available from BASF Corp in Florham Park, N.J.). Examples of inorganic UV absorbers include titania, ceria, silica, zinc oxide, and antimony oxide. Examples of light stabilizers include TINUVIN® 123, TINUVIN® 152 and TINUVIN® 292 (available from BASF Corp in Florham Park, N.J.). Examples of rheology and coating modifiers include BYK-088, BYK-179, BYK-361N, and BYK 1791 (available from BYK-GARDNER in Geretsried, Germany) and THIXATROL® (available from Elementis Specialties in East Windsor, N.J.) and ACEMATT® (available from Evonik Industries AG in Essen, Germany).

Examples of Synthesizing Hybrid Sol-Gel Coating Materials

Figure 2:
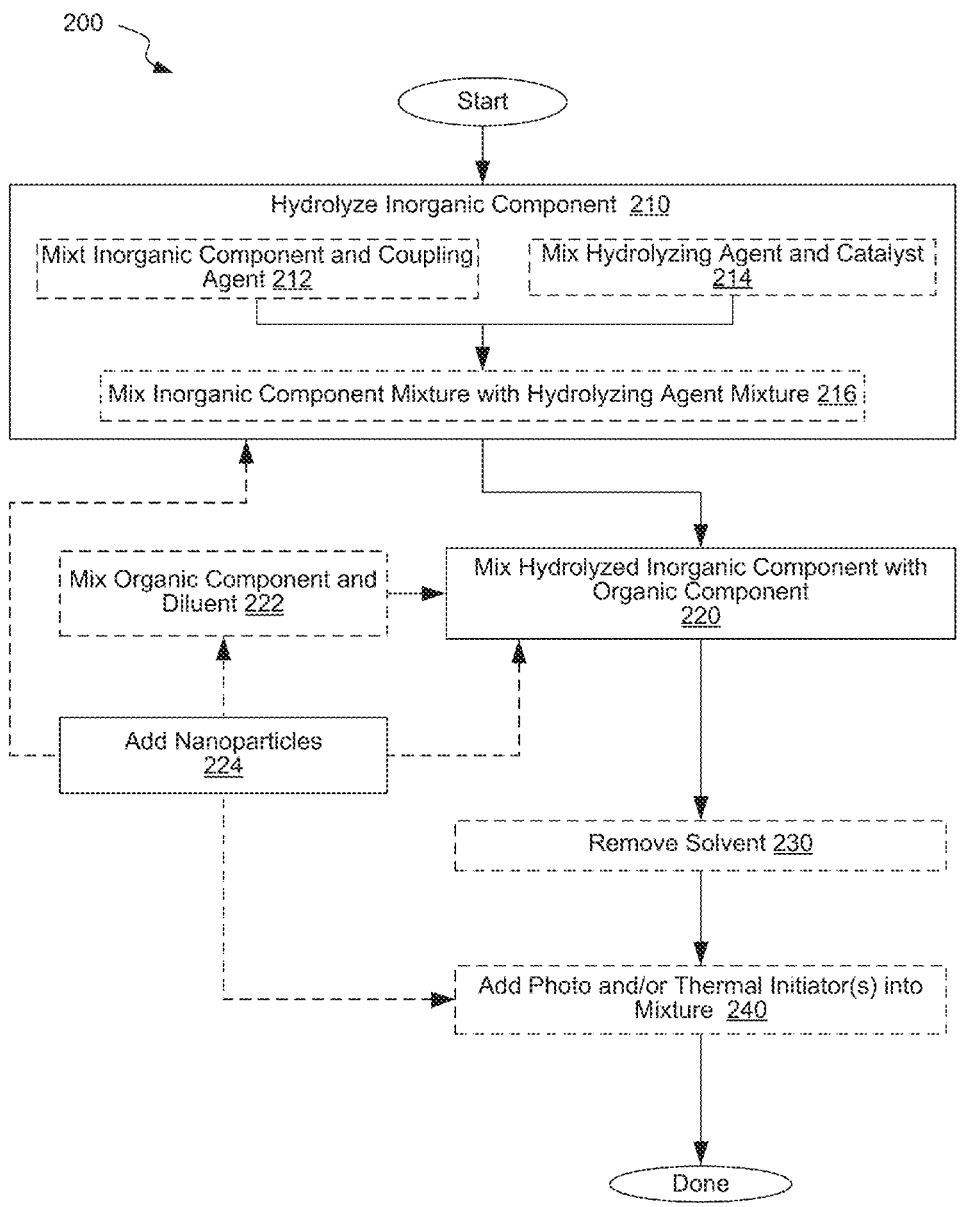
FIG. 2 is a process flowchart of a method of synthesizing a hybrid sol-gel coating material, in accordance with some embodiments.

FIG. 2 is a process flowchart of method 200 of synthesizing a hybrid sol-gel coating material, in accordance with some embodiments. Method 200 may commence with hydrolyzing an inorganic component during operation 210. The product of this operation is a hydrolyzed inorganic component. The starting precursor of this operation is an inorganic material, various examples of which are described above. One specific example is tetraethyl orthosilicate.

In some embodiments, hydrolysis operation 210 involves a number of different sub-operations. For example, an inorganic component may be first mixed with a coupling agent during optional operation 212. More specifically, tetraethyl orthosilicate may be mixed with methacryloxypropyltrimethoxysilane. It should be noted that at the end of hydrolysis operation 210, the coupling agent may be converted into its hydrolyzed derivative (e.g., methacryloxypropyltrimethoxysilane may be converted into one or more hydrolyzed derivatives of methacryloxypropyltrimethoxysilane). The mixture obtained during operation 212 may be referred to as an inorganic component mixture.

Furthermore, hydrolysis operation 210 may involve mixing a hydrolyzing agent and a catalyst during optional operation 214 (and prior to combining the hydrolyzing agent and the inorganic component). The hydrolyzing agent may be water or any other suitable agent. The mixture obtained during operation 214 may be referred to as a hydrolyzing agent mixture.

Operation 210 may then involve optional mixing operation 216, during which the inorganic component mixture (formed during operation 212) is mixed with the hydrolyzing agent mixture (formed during operation 216). This approach ensures that hydrolysis of the inorganic components happens simultaneously and uniformly.

The amount of water used to hydrolyze the inorganic component may be elected to substantially match all hydrolysable sites of the inorganic component. In other words, no excess of water may be added to prevent further reactions in the final mixture, which may be undesirable at this stage. For example, without being restricted to any particular theory, it is believed that excess of water may trigger condensation reaction.

In some embodiments, hydrolyzing the inorganic component is performed at a pH of between 2 and 2.2. Without being restricted to any particular theory, it is believed that this pH level causes rapid hydrolysis of the inorganic component (e.g., silane) while minimizing condensation reaction between hydrolyzed inorganic component molecules. When TEOS and silane are used for synthesis, this pH level corresponds to a large concentration of unreacted silanol groups and delays the formation of oligometric species (siloxanes, etc.). It should be noted that the unreacted silanol groups help with bonding to a substrate when applying the hybrid sol-gel coating material. Furthermore, the unreacted silanol groups may form organic/inorganic nanocomposite structure.

In some embodiments, hydrolysis is performed at room temperature. The hydrolysis time may be at least 1 hour or even at least 1.5 hours for the solution to appear homogenous.

Method 200 may proceed with combining the hydrolyzed inorganic component with an organic component during operation 220. Various examples of the organic components and nanoparticles are described above. For example, the organic may comprise acrylate groups operable to react with each other in a free-radical initiated polymerization reaction when the hybrid sol-gel coating material is activated.

In some embodiments, the organic component is premixed with a diluent during operation 222 and prior to combining it with the hydrolyzed inorganic component. In other words, operation 222 is performed prior to operation 220.

As noted above, the hybrid sol-gel coating material may include nanoparticles, which are added to one or more components of the hybrid sol-gel coating material during operation 224. Different possible stages of adding the nanoparticles are shown with dashed lead lines in FIG. 2. For example, the nanoparticles may be added to the inorganic component mixture and/or to the hydrolyzing agent mixture. In some embodiments, the nanoparticles may be added to the mixture of the organic component and the diluent. In the same or other embodiments, the nanoparticles may be added to a mixture of the hydrolyzed inorganic component and inorganic component. Furthermore, the nanoparticles may be added of the final hybrid sol-gel coating material as one of the end components. The nanoparticles may be introduced as a dispersion comprising a solvent. One example of the solvent is methyl-ethyl ketone.

In some embodiments, method 200 also comprises removing the solvent from a mixture of the hydrolyzed inorganic component, the organic component, and the nanoparticles during operation 230. Operation 230 may be optional and may be used to achieve 100% solid content in hybrid sol-gel materials. As stated above, the solid content of the resulting hybrid sol-gel coating material may be very high, e.g., at least about 90% by weight or even at least about 95% by weight.

In some embodiments, method 200 also comprises adding one or more of photo initiators and/or thermal initiators during operation 240. Various examples of initiators are described above. Furthermore, method 200 may also involve adding UV stabilizers and/or rheological modifiers.

The coverage which may be achieved with the hybrid sol-gel coating material may be between about 200 $m^2$/kg/micrometer and 2,000 $m^2$/kg/micrometer or, more specifically, 500 $m^2$/kg/micrometer and 1,000 $m^2$/kg/micrometer. It should be noted that depending on the concentration and deposition method, a single coating layer may have a thickness of more than 100 nanometer or, more specifically, more than 1 micrometer or even more than 100 micrometers.

Examples of Forming Hybrid Sol-Gel Coatings

Figure 3:
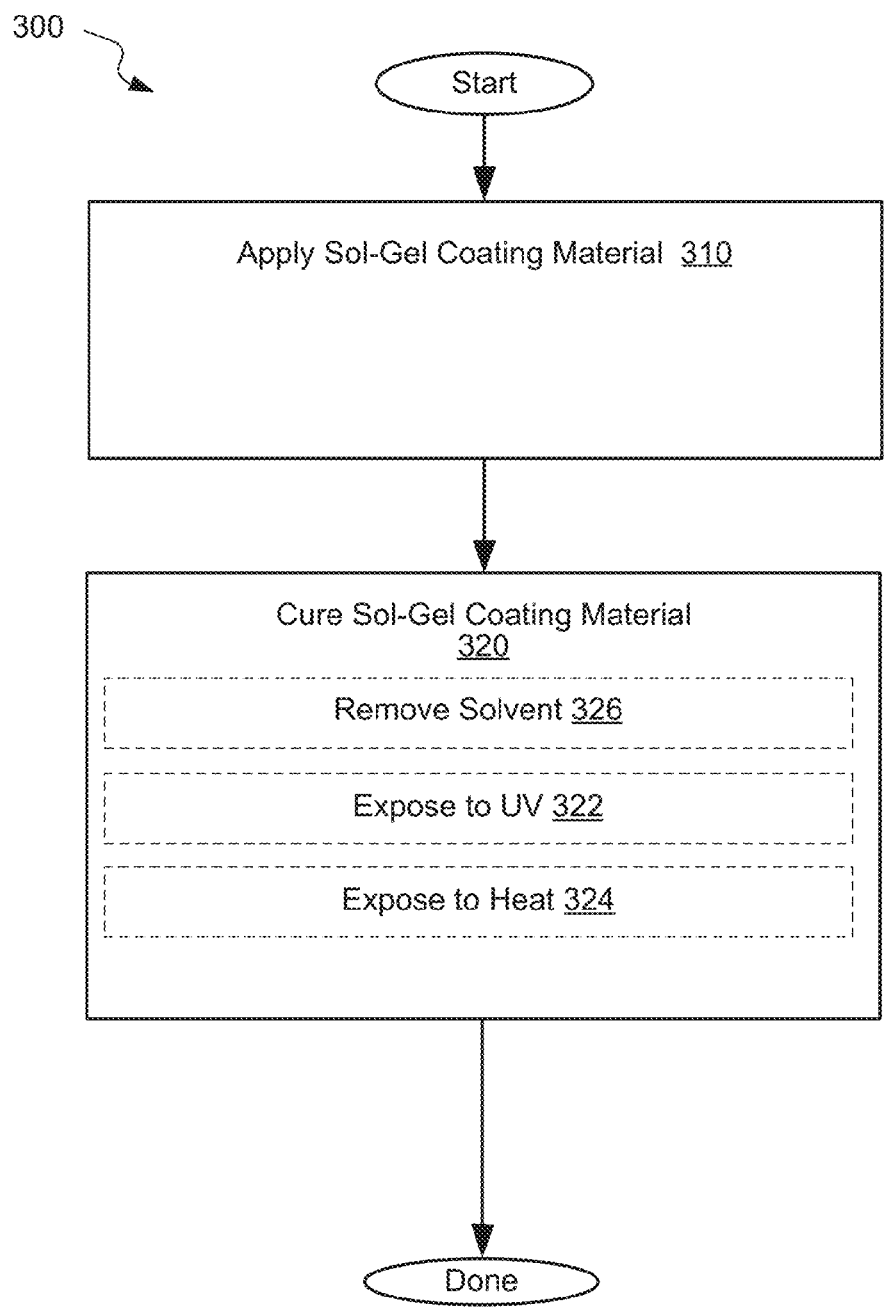
FIG. 3 is a process flowchart of a method of forming a hybrid sol-gel coating, in accordance with some embodiments.

FIG. 3 is a process flowchart of method 300 of forming a hybrid sol-gel coating, in accordance with some embodiments. In some embodiments, method 300 may commence with applying a hybrid sol-gel coating material onto a surface of a part during operation 310. Various examples of the hybrid sol-gel coating material are described above. For example, the hybrid sol-gel coating material may comprise a hydrolyzed inorganic component, an organic component, and nanoparticles. The inorganic component comprises hydroxyl groups operable to react with each other in a sol-condensation reaction during activation of the hybrid sol-gel coating material. The organic component comprises acrylate groups operable to react with each other in a free-radical initiated polymerization reaction when the hybrid sol-gel coating material is activated.

In some embodiments, the part receiving the hybrid sol-gel coating material comprises a material selected from the group consisting of non-ferrous alloys, such as aluminum, magnesium, nickel, electroless-nickel, ferrous alloys, such as steel and stainless steel, galvanized steel, and non-metallic substrates, such as glass, plastics, ceramics and anodized coatings.

In some embodiments, the hybrid sol-gel coating material is applied over a conversion coating, such as a phosphate or, more specifically, zinc phosphate, iron phosphate and zirconia-based coatings. For example, the hybrid sol-gel coating material may not itself have an active corrosion inhibitor. The hybrid sol-gel coating formed over the conversion coating greatly enhance the barrier properties of the stack in comparison to the conversion coating alone. At the same time, the conversion coating will provide protection to the substrate if the hybrid sol-gel coating becomes later damaged.

Method 300 may proceed with curing the hybrid sol-gel coating material during operation 320. The hybrid sol-gel coating may be formed during this operation. The hydroxyl groups of the inorganic component may react with each other in a sol-condensation reaction. Furthermore, the acrylate groups of the organic component may react with each other in a free-radical initiated polymerization reaction. Other types of reactions are described above.

In some embodiments, curing operation 320 comprises at least one of ultraviolet (UV) curing (operation 322) or heat curing (operation 324). More specifically, curing may involve both ultraviolet (UV) curing and heat curing. In this example, the UV curing may be performed prior to the heat curing.

Examples of Hybrid Sol-Gel Coatings

As noted above, a hybrid sol-gel coating is a coating formed from a hybrid sol-gel coating material when this material is applied, for example, onto the surface of a part. At this stage, the organic component is covalently bond to the inorganic component. In other words, the hybrid sol-gel coating comprises a hybrid inorganic-organic nanocomposite. In some embodiments, these molecules may be cross-linked, e.g., when the inorganic component, organic component, or both have multiple reactive sites. It should be noted that hybrid sol-gel coating materials may be made from components that are miscible with each other one another. As such, mixing of these components will result in hybrid sol-gel coating materials being homogenized on a molecular scale.

For purposes of this document a nanocomposite is defines as a multiphase solid material where one of the phases has one, two or three dimensions of less than 100 nanometers or structures having nanoscale repeat distances between the different phases that make up the material.

Furthermore, the hybrid sol-gel coating may include nanoparticles. The nanoparticles may be bound to the hybrid inorganic-organic molecules. For example, the nanoparticles may be functionalized resulting in ionic or even covalent bonds with the hybrid inorganic-organic molecules.

In some embodiments, the hybrid sol-gel coating is substantially transparent. This type of coatings is particularly useful for optical applications or where appearance of the part under the coating is important.

The abrasion resistance of the hybrid sol-gel coating may be less than about 50 milligrams after 1000 cycles or even less than 10 milligrams after 1000 cycles (per ASTM 4060, CS-10 wheels, 1 kg load).

The pull-off adhesion of the hybrid sol-gel coating may be at least about 10 MPa or even at least about 20 MPa (per ASTM D4541) to various substrates, such as steel, aluminum, and stainless steel.

The hardness of the hybrid sol-gel coating may be at least about 100 MPa (Martens) or even at least about 200 MPa (per ASTM D3363).

The hybrid sol-gel coating may pass 80-cycle CRS accelerated corrosion resistance test (per SAEJ2334) and/or may pass 72-cycle Al accelerated corrosion resistance test (per GMW15282).

The hybrid sol-gel coating may pass various corrosion resistance tests, such as acid bubble test, e.g., >250 hr/μm-1M $H_2SO_4$, >250 hr/μm-1M HCl, and/or >150 hr/μm-12M HCl.

The hybrid sol-gel coating may pass at least 100 heating-cooling cycles between −25° C. and +125° C.

The hybrid sol-gel coating may pass a damp heat test when used on Al and CRS substrates, e.g., at least 1000 hr 85° C./85% RH exposure without no cracking or delamination in the coating, loss of adhesion strength and no metal corrosion.

Experimental Results

The following experimental results corresponding a hybrid sol-gel coating prepared using the following formulation.

| Type | Material | Weight % |
| --- | --- | --- |
| Coupling Agent | Methacryloxypropyltrimethoxysilane (MPTS) | 6-12% |
| Inorganic Component | Tetraethoxysilane (TEOS) | 5-10% |
| Catalyst | Methacrylic acid | 0-2% |
| Hydrolyzing Agent | Water | 3-7% |
| Nanoparticles | Acrylate functionalized $SiO_2$ Nanoparticles | 15-25% |
| Organic component | Aromatic epoxy acrylate | 30-40% |
| Diluent | Isobornyl acrylate | 10-20% |
| Initiator | 1-Hydroxycyclohexylphenylketone | 1-5% |

Figures 4A, 4B, 4C:
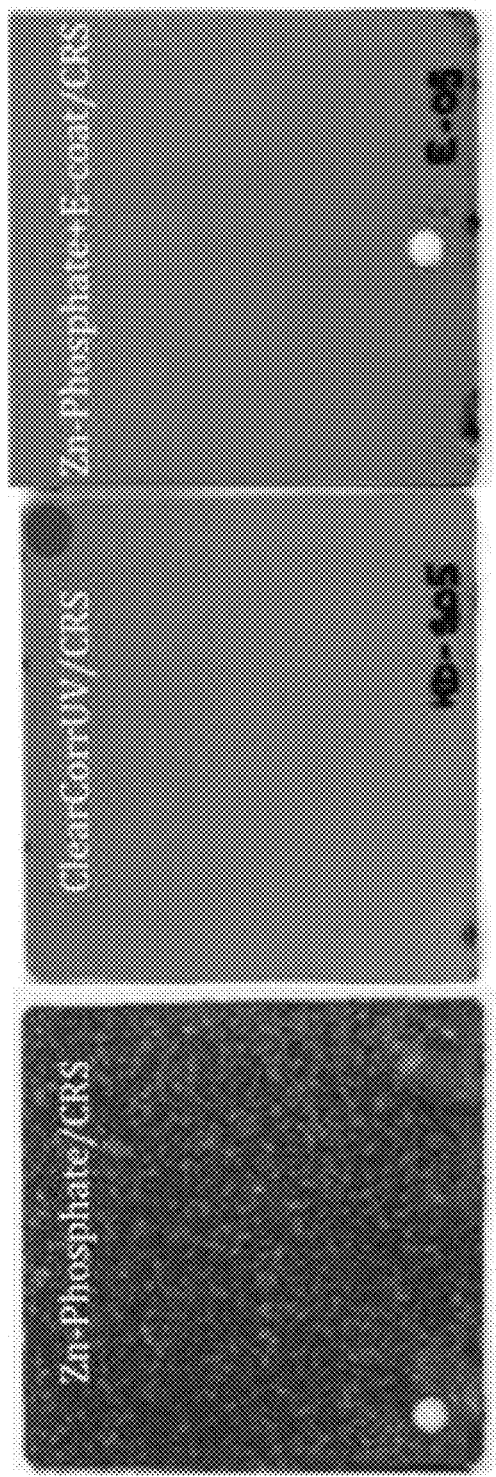
FIGS. 4A-4C are photographs of different coatings applied to the same type of substrate and subjected to 80 cycles SAEJ2334 testing.

FIGS. 4A-4C are photographs of different coatings applied to the same type of substrates and subject to 80 cycles cosmetic corrosion lab test (SAEJ2334). Specifically, FIG. 4A illustrates a samples formed using a cold roll steel (CRS) substrate with a conversion coating (zinc-phosphate) alone deposited on the substrate. FIG. 4B illustrates a CRS coating with a hybrid sol-gel coating described herein. Finally, FIG. 4C illustrates a combination of the conversion coating (zinc-phosphate) and E-coating, such as cathodic e-coating. The hybrid sol-gel coating provides much more superior corrosion protection in comparison to the conversion coating or even a combination of the conversion coating and e-coating.

In another experiment, the corrosion protection properties of the two types of coatings were investigated using three types of tests—electrochemical impedance spectroscopy (EIS), acid bubble testing, and cyclic accelerated corrosion testing. EIS measurements were performed on samples immersed continuously in a solution of 3.5% NaCl in deionized water at 20° C. 3.5% NaCl is the average salinity of seawater throughout the world. Two types of samples were tested. The first type was polished 304 stainless steel (304SS) coupons. The 304SS grade was selected because it is well known to be susceptible to chloride pit corrosion. The other samples were similar 304SS coupons coated with a 20 μm thick layer of the hybrid sol-gel coating.

Figures 5A, 5B:
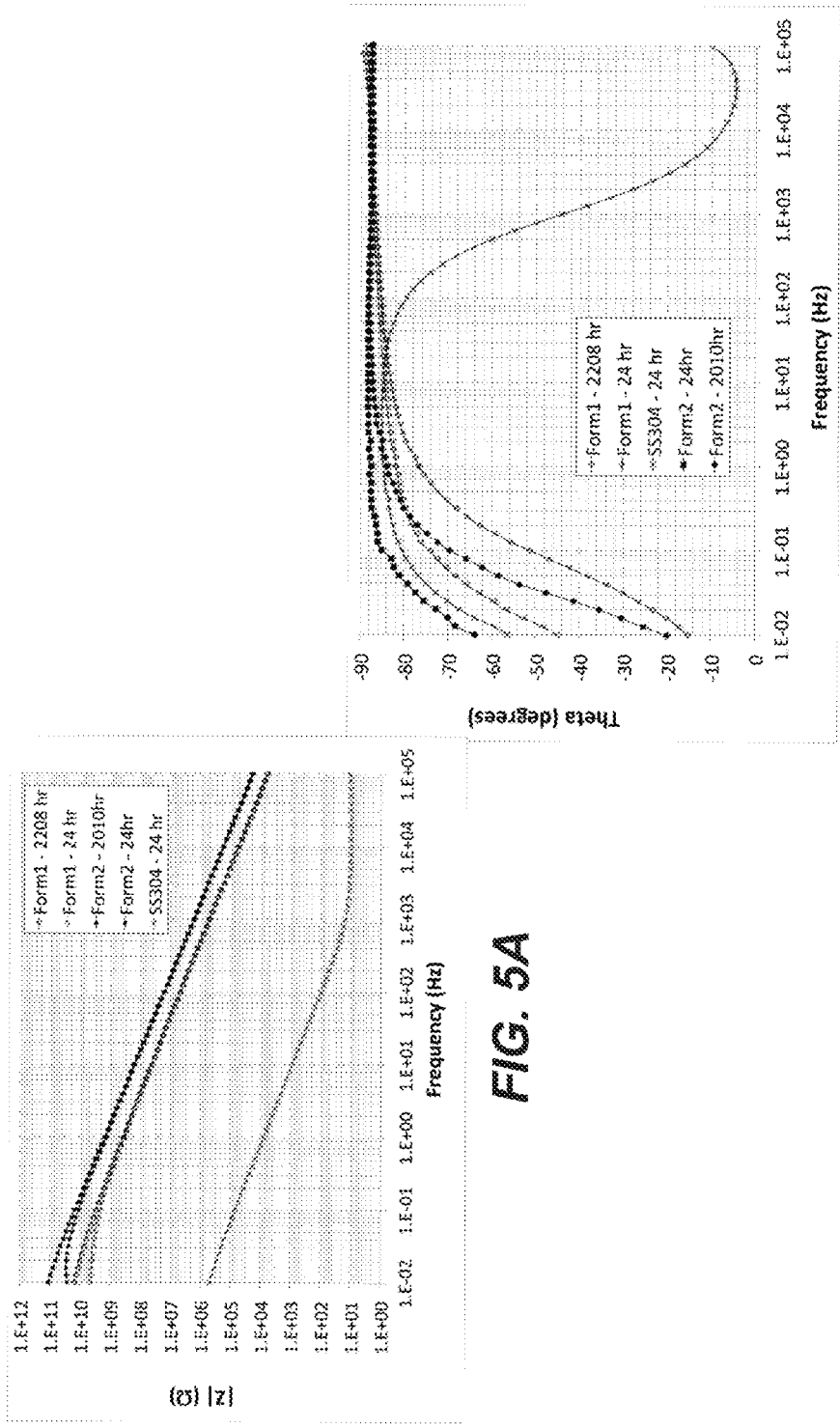
FIGS. 5A and 5B show electrochemical impedance spectroscopy (EIS) Bode plots for a bare 304 stainless steel sample after 24-hour exposure of and a similar steel sample coated with two different hybrid sol-gel coatings after 24-hour and >2000-hour of exposure to 3.5% NaCl solution.

EIS is a very sensitive technique to subtle changes in a coating, and when data is acquired over time it can be used to estimate water uptake (which alters the coating capacitance) and identify active corrosion. In fact, active corrosion mechanisms are often seen in the EIS Bode plots well before there are visible signs of corrosion. FIGS. 5A and 5B shows typical Bode plots for bare 304SS after 24 hours and 304SS coated with two hybrid sol-gel materials (described herein) after 24 hours and over 2000 hours of exposure. For the bare 304SS, corrosion commenced immediately upon exposure and is evident in measurements taken at 1 hr., which are not shown here, but are essentially identical to the curves at 24 hr. For the coated samples, if corrosion processes were active, there would be dips in the Bode plot at high frequencies (as is the case for the uncoated samples). The absence of a high-frequency dip permits modeling the response with a single time constant, and suggests that the coating is continuing to provide protection even after greater than 2000 hours (over 12 weeks) of continuous exposure.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatuses. Accordingly, the present embodiments are to be considered as illustrative and not restrictive.

What is claimed is:

1. A hybrid sol-gel coating material comprising:
   an inorganic component,
     wherein the inorganic component is hydrolyzed,
     wherein the inorganic component comprises hydroxyl groups operable to react with each other in a sol-condensation reaction when the hybrid sol-gel coating material is activated;
   an organic component,
     wherein the organic component comprises a mercapto-functionalized acrylate, and
     wherein the mercapto-functionalized acrylate comprises acrylate and thiol groups operable to react in a free-radical initiated polymerization reaction when the hybrid sol-gel coating material is activated; and
   nanoparticles,
     wherein the nanoparticles are dispersed with a mixture of the inorganic component and the organic component.

2. The hybrid sol-gel coating material of claim 1, wherein the inorganic component comprises a hydrolyzed derivative of a material selected from the group consisting of an alkyloxysilane, an aminosilane, an epoxy silane, an acroloxysilane, a methacrolyxysilane, and a polyether silane.

3. The hybrid sol-gel coating material of claim 1, wherein the inorganic component comprises a hydrolyzed derivative of a material selected from the group consisting of methacryloxypropyltrimethoxysilane (MPTS) and tetraethoxysilane (TEOS).

4. The hybrid sol-gel coating material of claim 1, wherein the inorganic component comprises a hydrolyzed derivative of methacryloxypropyltrimethoxysilane (MPTS) and a hydrolyzed derivative of tetraethoxysilane (TEOS).

5. The hybrid sol-gel coating material of claim 4, wherein a weight ratio of the hydrolyzed derivative of methacryloxypropyltrimethoxysilane (MPTS) to the hydrolyzed derivative of tetraethoxysilane (TEOS) is between about 0.1 and 10.

6. The hybrid sol-gel coating material of claim 1, wherein a concentration of the inorganic component in the hybrid sol-gel coating material is between about 10% by weight and 40% by weight based on a solid content of the hybrid sol-gel coating material.

7. The hybrid sol-gel coating material of claim 1, wherein the mercapto-functionalized acrylate of the organic component is a mercapto-functionalized polyester acrylate.

8. The hybrid sol-gel coating material of claim 1, wherein the mercapto-functionalized acrylate of the organic component comprises one or more multifunctional acrylates.

9. The hybrid sol-gel coating material of claim 1, wherein a concentration of the organic component in the hybrid sol-gel coating material is between about 30% by weight and 80% by weight based on a solid content.

10. The hybrid sol-gel coating material of claim 1, wherein the nanoparticles comprise a material selected from the group consisting of silica, alumina, titania, ceria, zirconia, and antimony oxide.

11. The hybrid sol-gel coating material of claim 1, wherein a concentration of the nanoparticles in the hybrid sol-gel coating material is between is between about 5% by weight and 30% by weight based on a solid content of the hybrid sol-gel coating material.

12. The hybrid sol-gel coating material of claim 1, further comprising a methacrylic acid.

13. The hybrid sol-gel coating material of claim 1, further comprising one or more reactive diluents.

14. The hybrid sol-gel coating material of claim 13, wherein the one or more reactive diluents comprise an acrylate.

15. The hybrid sol-gel coating material of claim 14, wherein the acrylate of the one or more reactive diluents is selected from the group consisting of isobornyl acrylate, hexanediol diacrylate, and trimethylolpropane triacrylate.

16. The hybrid sol-gel coating material of claim 14, wherein a concentration of the acrylate of the one or more reactive diluents in the hybrid sol-gel coating material is between about 10% and 20% by weight.

17. The hybrid sol-gel coating material of claim 1, wherein a solid content of the hybrid sol-gel coating material is at least about 90% by weight.

18. The hybrid sol-gel coating material of claim 1, further comprising an initiator selected from the group consisting of a photo-initiator and a thermal-initiator.

19. A method of synthesizing a hybrid sol-gel coating material, the method comprising:
hydrolyzing an inorganic component thereby forming a hydrolyzed inorganic component;
  wherein the hydrolyzed inorganic component comprises hydroxyl groups operable to react with each other in a sol-condensation reaction during activation of the hybrid sol-gel coating material; and
mixing the hydrolyzed inorganic component with an organic component and nanoparticles,
  wherein the organic component comprises a mercapto-functionalized acrylate,
  wherein the mercapto-functionalized acrylate comprises acrylate and thiol groups operable to react in a free-radical initiated polymerization reaction when the hybrid sol-gel coating material is activated, and
wherein the nanoparticles are dispersed with a mixture of the inorganic component and the organic component.

20. A method of forming a hybrid sol-gel coating:
applying a hybrid sol-gel coating material onto a surface of a part,
  wherein the hybrid sol-gel coating material comprises:
    an inorganic component, being hydrolyzed and comprising hydroxyl groups,
    an organic component, comprising a mercapto-functionalized acrylate,
      the mercapto-functionalized acrylate comprising acrylate and thiol groups, and
    nanoparticles dispersed with a mixture of the inorganic component and the organic component; and
curing the hybrid sol-gel coating material thereby forming the coating,
  wherein, during curing, the hydroxyl groups of the inorganic component react with each other in a sol-condensation reaction, and
  wherein, during curing, the acrylate and thiol groups of the mercapto-functionalized acrylate of the organic component react in a free-radical initiated polymerization reaction.

\* \* \* \* \*